United States Patent
Banko

(12) 
(10) Patent No.: US 6,390,422 B2
(45) Date of Patent: *May 21, 2002

(54) OBJECT SUPPORT STRUCTURE FOR STROLLER OR CARRIAGE

(76) Inventor: Lucia D. Banko, 33 Walbrooke Rd., Scarsdale, NY (US) 10583

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,220

(22) Filed: Apr. 13, 1999

(51) Int. Cl.[7] ............................................... B65B 67/12
(52) U.S. Cl. ........................ 248/95; 248/215; 248/340; 211/113; 224/409
(58) Field of Search ................................ 248/100, 214, 248/215, 227.1, 227.2, 228.1, 276.1, 301, 305, 311.2, 339, 340, 341, 95–98; 211/74, 88, 113; 383/23, 22, 24, 13; 224/409, 439; 223/85; 150/117

(56) References Cited

U.S. PATENT DOCUMENTS

| | | | | |
|---|---|---|---|---|
| 1,239,298 A | * | 9/1917 | Norman | |
| D96,681 S | * | 8/1935 | Lending | |
| 2,165,869 A | * | 7/1939 | Mathiesen | |
| 2,757,699 A | * | 8/1956 | Fancher et al. | |
| 3,138,259 A | * | 6/1964 | Sitt | |
| 3,586,276 A | * | 6/1971 | O'Mahoney | 248/128 |
| 3,638,890 A | * | 2/1972 | Bjurrell et al. | 248/215 |
| 4,027,842 A | * | 6/1977 | Mittleman | 248/75 |
| 4,140,163 A | * | 2/1979 | Usner | |
| 4,186,859 A | * | 2/1980 | Frankfort et al. | |
| 4,240,480 A | * | 12/1980 | Strobel | |
| 4,244,453 A | * | 1/1981 | Herz | |
| 4,560,096 A | * | 12/1985 | Lucas et al. | 22/42.42 |
| 4,576,388 A | * | 3/1986 | Pope | 280/33.99 |
| 4,830,238 A | * | 5/1989 | Widinski et al. | |
| 4,856,744 A | * | 8/1989 | Frankel | 248/215 |
| 4,978,043 A | * | 12/1990 | Uke | |
| 5,014,948 A | * | 5/1991 | Asaro et al. | 248/215 |
| 5,020,755 A | * | 6/1991 | Frankel | 248/215 |
| 5,040,711 A | * | 8/1991 | Niederhauser et al. | |
| 5,094,414 A | * | 3/1992 | Eddy, Jr. | 248/95 |
| 5,143,335 A | * | 9/1992 | Frankel | 248/215 |
| 5,244,175 A | * | 9/1993 | Frankel | 248/215 |
| 5,348,166 A | * | 9/1994 | Lema | 211/30 |
| 5,464,183 A | * | 11/1995 | McConnell et al. | 248/311.2 |
| 5,501,345 A | * | 3/1996 | Hilstolsky et al. | |
| 5,531,238 A | * | 7/1996 | Azzarelli et al. | 135/66 |
| 5,697,508 A | * | 12/1997 | Rifkin et al. | |
| 5,836,486 A | * | 11/1998 | Obsugi | 223/85 |
| 6,112,914 A | * | 9/2000 | Naficy | 211/113 |

* cited by examiner

Primary Examiner—Leslie A. Braun
Assistant Examiner—Korie H. Chan

(57) ABSTRACT

A support that is to be attached to the center rail of the handle structure of a stroller or carriage. The support is mounted to the center rail by one or more hooks and has an elongated bar that is suspended from the rail and hangs below and parallel to it. Objects, such as the handle hoops of a bag can be looped over the bar and held by it. In one embodiment, the support mounted to the rail has upper and lower bars that are parallel to each other with a space between the two. A bag has fasteners on a flap and the bag front panel. The bag flap is passed over the bottom bar and the fasteners brought together to secure the flap. This hangs the bag from the support, which in turn is hung from the stroller handle center rail. A bag with a flap in sections also can be used with a support having only a top bar.

22 Claims, 5 Drawing Sheets

US 6,390,422 B2

OBJECT SUPPORT STRUCTURE FOR STROLLER OR CARRIAGE

FIELD OF THE INVENTION

The present invention relates generally to baby strollers or carriages and to a support for attachment to the center rail of the stroller handle from which objects can be hung.

BACKGROUND OF THE INVENTION

Strollers and carriages for transporting infants are well-known. They are commonly used during various outings, such as shopping or running errands The stroller or carriage has a front compartment in which the infant is placed and a rear portion from which a handle structure extends. The handle structure has a pair of spaced upwardly extending side rails with a center rail connected at the side rail upper ends. The user wheels the stroller or carriage by pushing on the center rail. All of this is well-known.

It is desirable to provide a degree of convenience to the user when he or she not only has to push the infant in the carriage or stroller but also has to carry other objects, such as bags filled with various items. It would be desirable to be able to transport the bag or other object as part of the stroller or carriage itself so that the user's hands would be totally free to manipulate the stroller and unencumbered so as to be able to attend to the infant passenger. However, it is usually unwise from the point of view of safety to place such bag or objects in the stroller or carriage compartment in which the infant is located.

Attempts have been made to provide various types of attachments to solve this problem. For example, U.S. Pat. No. 5,464,183 shows an elongated bar having a width equal to the distance between the stroller handle two upwardly extending side rails. Brackets provided at the ends of the bar are fastened to the handle side rails. The bar extends rearwardly of the handle structure and one or more hooks are provided on the portion of the bar that faces the user. Objects are to be hung from these hooks. This structure has an overall disadvantage in that is relatively complicated, requiring a mechanical bracket for fastening each end of the bar to a handle upwardly extending side rail. This also makes it somewhat difficult to mount the bar to and detach it from the handle. Also, the hooks that face the user are exposed and thereby could provide a hazard when using the stroller or carriage.

In U.S. Pat. No. 5,244,175 a support assembly is provided having a portion which is to be mounted to the stroller handle center rail. In this unit, the attachment portion determines the width of the part of the assembly that is available for purposes of supporting objects. This assembly is relatively complicated both in structure and manner of attachment.

BRIEF DESCRIPTION OF THE INVENTION

The present invention is directed to a support that is to be attached to the center rail of the handle structure of a stroller or carriage. The support has an elongated bar that is suspended from the center rail and hangs parallel to it. Objects, such as the hoops of a bag handle can be looped over the bar and held by it. The support has one or more hooks, preferably of a type that can be snap fit over the handle center rail, to hang it from the center rail. In one embodiment, the support has two bars that are parallel to each other with a space between the two. A bag has fasteners on a flap and the bag front panel. The bag flap is passed through the space between the bars over the bottom bar and the fasteners brought together to secure the flap to the bag panel. This hangs the bag from the support, which in turn is hung from the stroller handle center rail. A bag with a flap in sections also is provided to be used with a support having only one bar.

The support is easy to attach to and remove from the handle center rail. It also leaves the handle center rail relatively unobstructed so that the user has no difficulty in pushing the stroller. Since the ends of the bar are not connected to any part of the stroller handle structure, it is easy to hang an object from the support.

OBJECTS OF THE INVENTION

It is therefore an object of the invention to provide a support device to be attached to the center rail of a stroller handle to support objects hung therefrom.

Another object is to provide a support for use with a stroller and a tote type bag that can be hung from the support by use of mating fasteners on the flap and the bag body.

An additional object is to provide a novel tote type bag that can be supported from the generally horizontal bar of a support attached to the center rail of a stroller handle.

A further object is to provide a support having a bar on which object are to be hung, the support being mounted to the center rail of a handle structure with the bar below and generally parallel to the center rail.

Yet another object is to provide a support from which objects can be hung with the support being easily attached to or removed from the stroller handle center rail.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1:
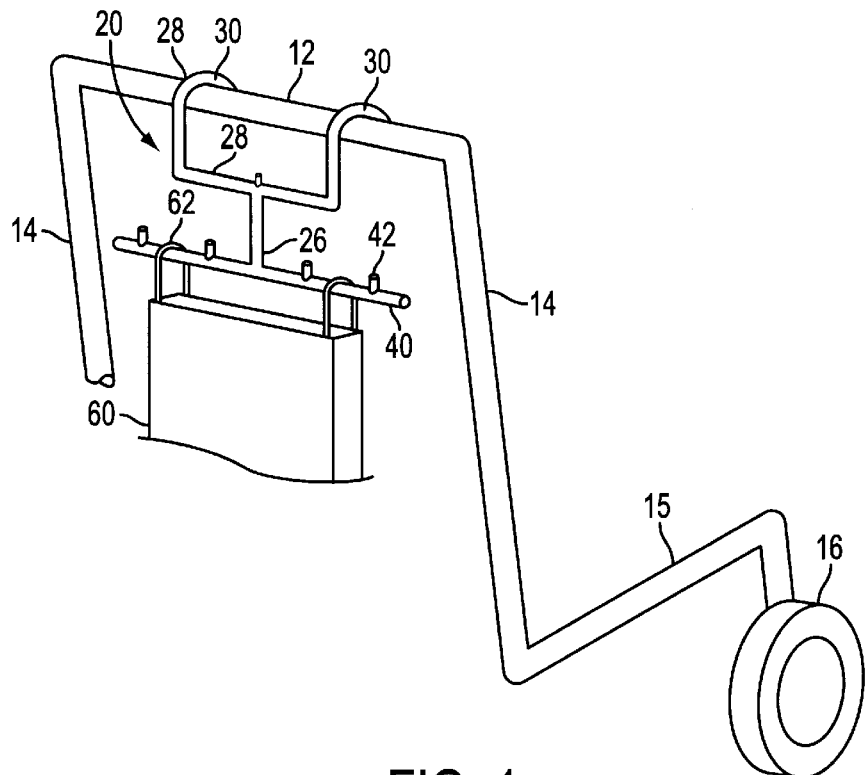
FIG. 1 is a perspective view of a portion of a stroller and one embodiment of the support of the present invention.

Referring to FIG. 1 reference numeral 15 indicates the bottom portion of the body of a stroller 15 having wheels 16.

Only a portion of the stroller body is shown and this can be of any conventional construction. The stroller has the typical handle assembly formed by a pair of side rails 14 projecting upwardly at an angle from the body and a center rail 12 connected to the top ends of the side rails. The center rail is generally horizontal to the ground with the stroller in use. The user typically pushes on the center rail 12 to move the stroller with an infant (not shown) in the body compartment. While the invention is illustratively described with respect to a stroller it also has applicability to devices such as carriages and shopping carts.

The support 20 of the present invention is shown attached to the handle center rail 12 and holds an object, illustratively such as a bag 60, that is hung from the bar. The support 20 holds one or more objects in a manner such as to permit the user to have his or her hands free while pushing the stroller. The support 20 includes a bar 40 which is to be generally horizontal to the central rail 12 and from which one or more objects 60 is to be hung. Bar 40 can be of any desired length. It can even be longer than the distance between the handle upwardly extending side rails since its ends are not connected to any part of the handle. In a typical embodiment the bar has a length of from about one third to about two thirds of the distance between the handle side rails.

Figure 3:
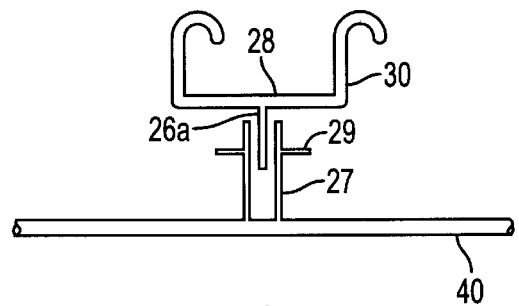
FIG. 3 is a view of a further embodiment of the support with an adjustable height arrangement.

Extending vertically upwardly from the center part of the bar 40 is the lower end of a stem 26, The stem 26 can be of any desired length and, as illustrated with respect to FIG. 3, its length can be adjustable. A cross member 28 is at the upper end of the stem 26 and is parallel to the bar 40. The cross member 28 is preferably of a length less than that of the bar 40. Extending upwardly from the cross member 28 is a pair of spaced hooks 30 which are to fit around and over the stroller center rail 12 to hang the support from the center rail. With the hooks 30 attached to the stroller center rail, the bar 40 of the support is parallel to and below the center rail and is in a position to hold an object.

As seen in FIG. 1, one of the hoops 62 of the bag 60 is placed over each end of the bar 40. This is easy to accomplish since the ends of the bar are unobstructed. The bag 60 hangs by its hoops 62 from the bar 40. Other objects such as those having a strap can be hung from the bar. With the bag 60 being held on the support 20 the user's hands are free to push the stroller center rail 12 one hand on each side of one of the hooks 30. This provides ease-of-use of the stroller.

One or more objects also can be hung from the cross member 28, such as by tying the ends of a cord holding the object around the cross member. FIG. 1 also shows a plurality of upwardly extending projections 42 on each side of the stem 26. The bag hoops 62 and strap or ties of other objects hung from the support are prevented from sliding off of the bar by the projections 42. Projections 42 also can be provided on the cross member 28.

While in FIG. 1 the stem 26 is shown as being transverse to both the bar 40 and the cross member 28 so that the bar 40 and center rail 12 both will lie in a plane that is generally transverse to the ground, it also can be at an angle so that the bar 40 will be inward of the handle structure closer to the stroller body. This would place the bag 60 further away from the user so as not to interfere with his or her body. Use of this design would depend on whether or not the stroller has enough space between the handle center rail and the body compartment.

The support 20 can be made of any suitable material, such as metal or of plastic such as polypropylene or ABS. The support is made by any suitable process compatible with its material. It is preferred for purposes of economy that the support be molded or cast as a single piece. The bar 40 can be of any shape, such as round, flat, oval, etc.

It is preferred that the hooks 30 have a shape, construction and be of a material such that they can snap over the center rail 12 for easy attachment and removal of the support as desired. As an alternative, the top end of the stem 26 can be detachable from the cross member 28, such as by a screw thread arrangement. This would permit a more permanent mounting of the hooks to the center rail. The hooks 30 may be configured such as to permit the support 20 to swing on its hooks 30 on the center rail, together with the object that it holds, as the stroller is moved.

Figure 2:
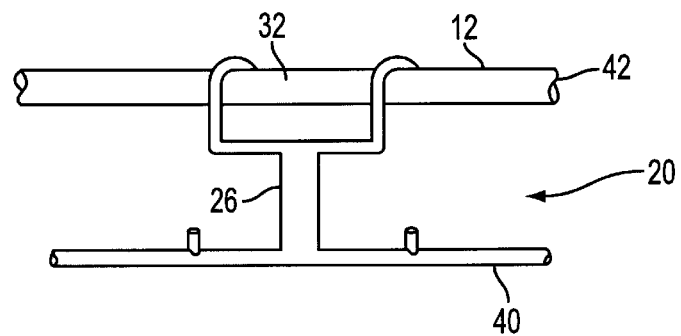
FIG. 2 is a perspective view of another embodiment of the support having a different type of hanger hook.

FIG. 2 shows another embodiment of the support 20. Here, instead of there being two hooks 30, there is a single hook 30-1 that extends from the stem 26. Here, the single hook 30-1 can be made wider than one of the hooks 30 of FIG. 1 in order to provide greater stability for the support 20. The embodiment here also shows the projections 42 on the bar 40 on each side of the stem 26. Any of the supports of the invention can be made without the projections 42 or with such projections on only one side of the stem.

FIG. 3 shows a further embodiment of the support in which the upper end of the stem 26a is attached to the cross member 28. The lower end of the stem has a plurality of holes along its length and fits into a collar 27 which is now the bottom of the stem. There is a pin 29 that passes through the collar to engage in the holes of the stem 26a. Accordingly, the distance of the cross member 28 from the bar 40 can be adjusted thereby effectively setting the distance of the bar 40 from the stroller center rail 12. The reverse arrangement can be used with a plurality of holes in the collar and a single hole in the stem.

Figure 4:
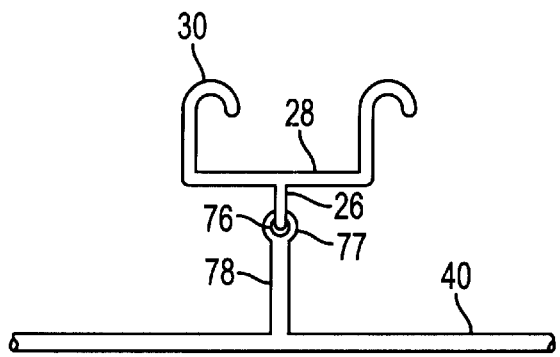
FIG. 4 illustrates an embodiment of the support with a universal joint.

In FIG. 4 the lower end of the stem 26 is shown as having the ball part 76 of a universal swivel joint that fits into a socket 77. The socket 77 has a vertical extension 78 which is attached to the bar 40. Thus, with the support 20 hung from the stroller center rail 12, the bar 40 will move so that the object hung from the bar, such as the bag 60, will always be generally vertical to the center rail, even though the stroller may be inclined, The various features of FIGS. 1–4 can be combined, for example, such as the adjustable height arrangement shown in FIG. 3 used with the swivel joint of FIG. 4 and with either the single hook configuration of FIG. 2 or the multi-hook arrangement of FIG. 1.

Figure 5:
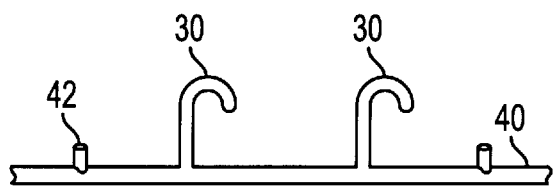
FIG. 5 is a view of a further embodiment of the support.

In each of the embodiment of FIGS. 1–4, as shown, the stem 26 and cross member 28 is used for the attachment of the single or plurality of hooks and this construction spaces the bar 40 from the stroller center rail 12. However, the stem is not necessary, As shown in FIG. 5, the hooks 30 can be attached directly to the bar 40. This simplifies the construction. The length of the lower portion of a hook 30, that is, before it starts to curve at its upper end which is attached to the center rail, can be made as long as desired to select the vertical spacing of the bar 40 from the stroller center rail 12.

Figure 6:
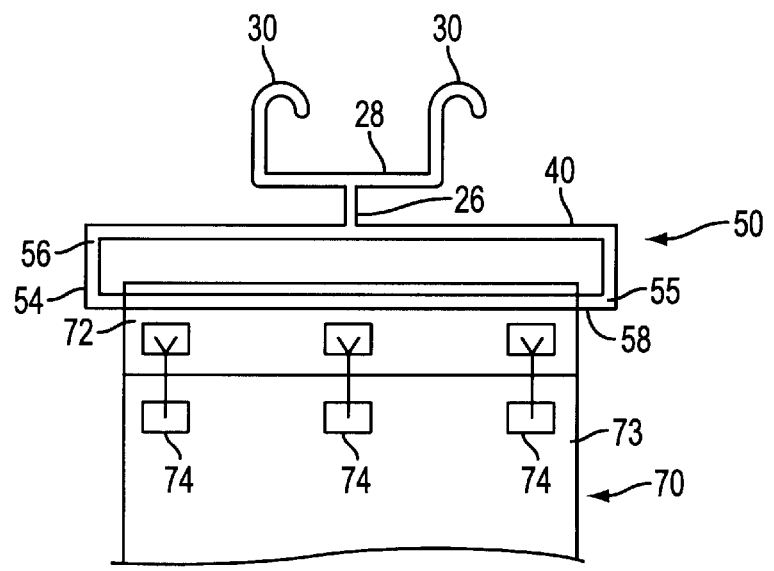
FIG. 6 is a view of a further embodiment of the support and a tote type bag.

FIG. 6 shows an embodiment of the invention in which the support 50 is configured to have a second bar 58 suspended by vertical arms 54 from the first bar 40 below and parallel to the first bar. A space 56 is left between the first and second bars. The support 50 of FIG. 6 is to be hung from the stroller center rail 12 by the hooks 30 and the hoops of a bag or other object hung from the upper bar 40, as shown in FIG. 1, and the ties of another object tied around the lower bar 58.

In FIG. 6 another form of bag 70 is shown that is to be hung from the lower bar 58, The bag 70 is more of the tote type and has a flap 72 extending from its rear panel. The flap is passed through the space between the bars and laid over and around the second lower bar 58. On the outside of the bag front panel 73 is a series of fastener strips 74, such as on part of a VELCRO fastener. A single elongated fastener strip can be used. On the inside of the bag flap 72 (not shown) is the other half of the fasteners 74. When the fasteners 74 on the bag front panel and those on the inside the flap 72 are brought together, the flap captures the lower bar 68, that is, it is hung on the lower bar 58. When the support 50 is on the stroller center rail 12 the bag 70 is suspended from the support 50 lower bar 58. A bag, such as one having a strap, or another object can be hung off of the support 60 top bar 40 even with the bag 70 in place on the bottom bar 58.

Also as shown in FIG. 6, one of the vertical arms 54 from the upper bar 40 is connected to the lower bar 58 by a snap latch type fastener 55. This permits the support to be opened at the latch 55 so that the bag flap 72 can be slid onto or off of the lower bar 68 without having to unfasten the flap fasteners. This also permits the loops of a bag or other object to be hung on the lower rail 58.

Figure 7:
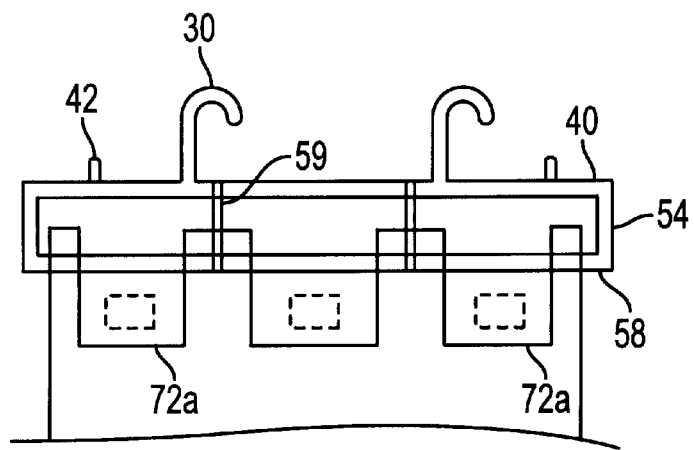
FIG. 7 is a view of an embodiment of the support and a further embodiment of a tote bag.

FIG. 7 shows a modification of the two bar support 50 of FIG. 6. Here, as in FIG. 5, the hooks 30 are connected directly to the top bar 40. Also there are a plurality of vertical support struts 59 between the upper and lower bars 40 and 58. This strengthens the support. In FIG. 7, the bag flap has a plurality of sections 72a that overlie the lower bar 58 between the struts 59. Each of the flap sections 72a has a portion of a fastener 74 that mates with a corresponding fastener on the bag front panel. As in FIG. 6, the bag 70 is suspended from the support lower bar 58 when the support is hung on the stroller center rail 12.

A bag having sectioned flaps, such as in FIG. 7 can be hung from a single bar support 20, such as in FIG. 1, with a flap section 72a on each side of the stem 26.

Figure 8:
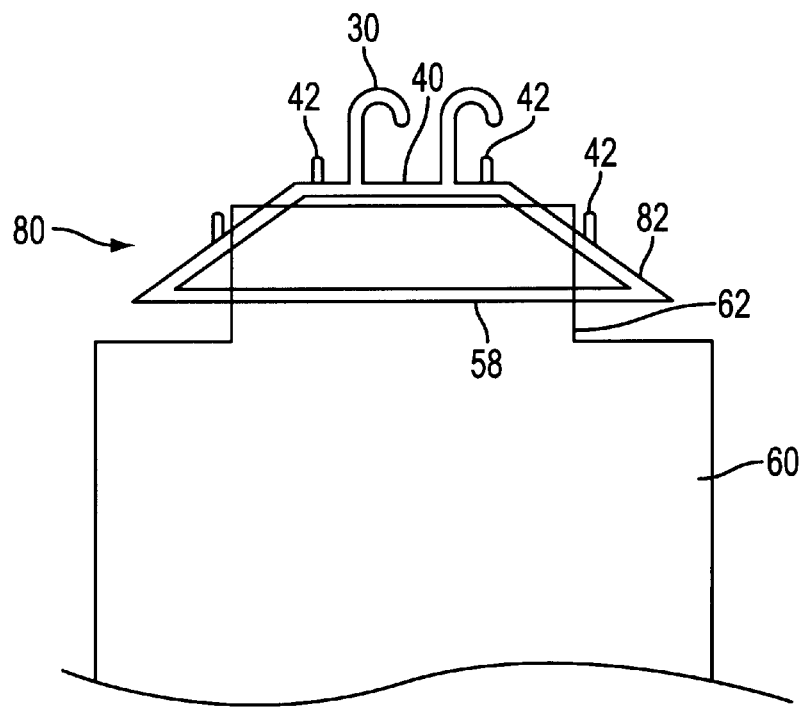
FIG. 8 is an embodiment of the support with angled arms between upper and lower bars.

FIG. 8 shows another embodiment in which the support 80 has the upper and lower spaced horizontal bars 40 and 58. The upper bar is shorter than the lower bar and the two are connected together by angled arms 82. The projections 42 illustratively are formed on the upper bar 40 and on the angled arms 82. The support 80 can accommodate objects hung on the top bar 40, such as by the loops 62 of a bag 60 with one loop on each one of the angled arms 82 and held by a projection 42. Also, the flap 72 of a bag 70 with the fasteners 74 can be suspended from the lower horizontal bar 58.

Figure 9A:
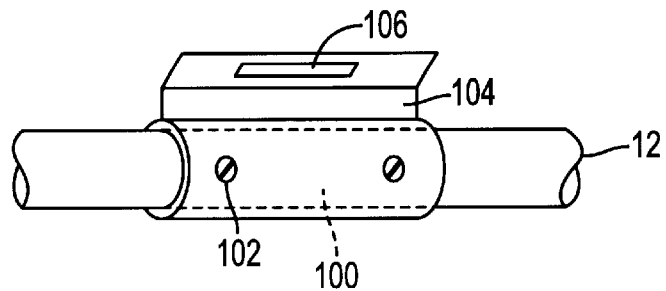
FIG. 9A is a view of a mounting block for a hanger hook.
Figure 9B:
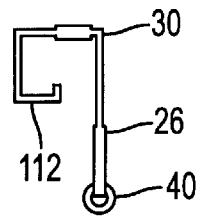
FIG. 9B a view of the hanger hook.

FIGS. 9 and 10 show arrangements to obtain a more secure fastening of a hook 30 to the stroller center rail 12. In FIG. 9A a sleeve 100 is secured to the rail by screws 102. On the sleeve 100 is a mounting block 104 that has one or more slots 106. As seen in FIG. 9B, the hook upper end 108 is shaped to conform to fit around the block 104 and an end tab 112 to fit into the slot 106. The block is preferably oriented relative to rail 12 so that the slot 106 faces away from the user, i.e. toward the stroller compartment. This provides a larger surface area of engagement of the hook end with the block and thereby a more stable mounting of the support. The slot 106 can be positioned facing in an upward direction. If the support has two hooks, the mounting block is made wide enough to support two hooks or there can be two mounting blocks.

Figure 10A:
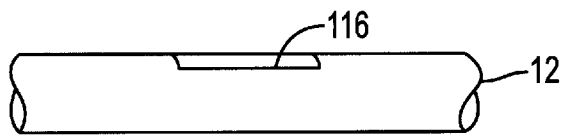
FIG. 10A is a view of a modification to the stroller handle center rail.
Figure 10B:
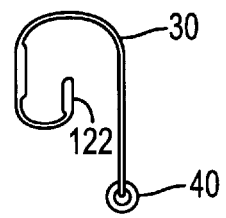
FIG. 10B a hanger hook for use with the rail.

In FIG. 10A a slot is made in the rail 12 to accept the tab end 122 of the curved end of the hook of FIG. 10B is shaped to conform to fit around the rail. Here the slot 116 is preferably made facing upward or toward the rear away from the user. Since the rail is usually of tubular material the slot 116 can be made either during manufacture of the stroller or after it is purchased by the user.

Figure 11A:
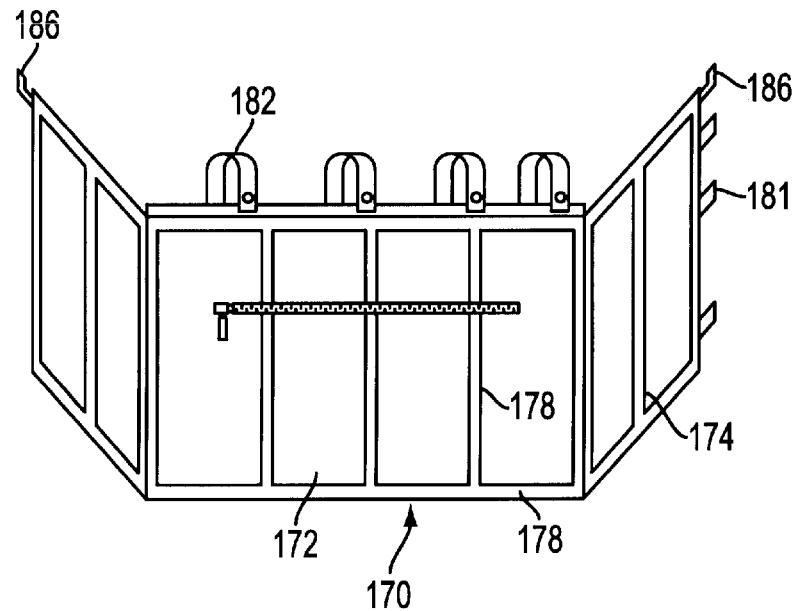
FIG. 11A is a view of a safety flag to be held by the support.
Figure 11B:
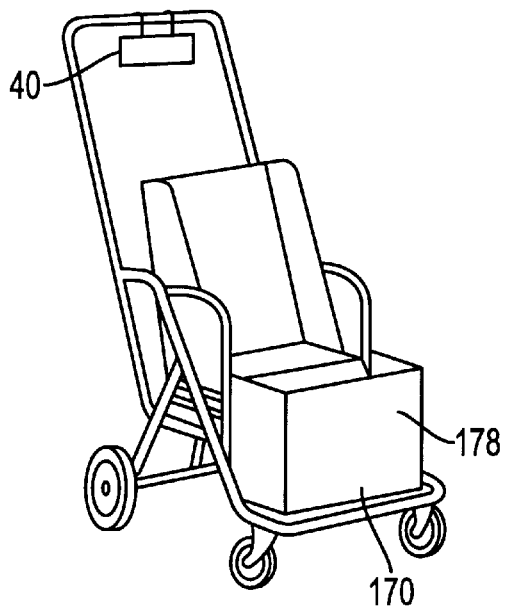
FIG. 11B shows the flag mounted on a stroller.

In FIGS. 11A and 11B there is shown a stroller with a support such as 40 hung on the center rail 12. A safety flag 170, as shown in FIG. 11A, is formed of a center section 172 with a foldable section 174 at each end. The flag is made of any suitable material such as plyboard, fabric covered board and others. A plurality of strips of reflective material 178 are placed on the flag in any desired pattern. The flag end sections 174 are folded back toward the center of the center section 172 and fastened together by fasteners 181 so that the folded size of the flag is that of the center section. A plurality of straps 182 are fastened along the flag top edge. Each strap 182 has a suitable fastener, such as of the snap type or of Velcro, at its end. The straps 182 are fastened over a bar of the support, such as shown in FIGS. 6 and 7, to hang the flag 172 from the support.

FIG. 11B shows the flag 170 unfolded with the ends of the end sections 174 fastened to the stroller by fastener straps 186, illustratively shown at the stroller handle pivot joints. The bottom edge of the flag is shown resting on the stroller footrest. The flag covers the front and sides of the stroller and the infant is within the flag. The reflective material strips 178 of the flag provides more visibility for the stroller as it is being wheeled. This is useful during times of poor visibility, such as at dusk, when the stroller is in a dangerous environment such as being pushed across a street where there is traffic.

Although the present invention has been described and illustrated in detail, it is to be understood that the same is not by way of limitation and the spirit and scope of the invention is set forth in terms of the appended claims.

I claim:

1. A support in combination with a carriage or stroller wherein said support is to be attached to a generally horizontal rail of a the carriage or stroller and to be located below the horizontal rail and spaced away from each of two spaced upwardly extending side rails connected to the ends of the horizontal rail and for hanging an article thereon, said support comprising:

an elongated bar for mounting only to and to be located below the horizontal rail and not connected to either one of the upwardly extending side rails to permit unobstructed access to the length of said bar from either of its ends;

at least one hook element attached generally transverse to said bar at a first point intermediate the ends of the bar to engage and be connected to only the horizontal rail of the carriage or stroller to hold said bar spaced below the horizontal rail, and said bar extending in a direction parallel with the horizontal rail but spaced from the side rails of the carriage or stroller, and at least one projection on said bar at a second point between an end of the bar and spaced from said at least one hook element with access to the said projection being from an open end of the bar closest to the second point to permit hanging of an article from said bar between said first and second points with the article being prevented from falling off of the end of the bar by the projection.

2. A support as in claim 1 wherein said at least one projection extends from said bar toward the horizontal rail.

3. A support as in claim 1 wherein there are a pair of said hook elements spaced apart along said bar, each said hook element to engage said horizontal rail.

4. A support as in claim 1 wherein said at least one hook element is attached directly to said bar and is connected to the horizontal rail of the stroller or carriage at at least two spaced points along the horizontal rail to prevent tipping of the bar when an article is hung from the bar.

5. A support as in claim 4 wherein there are a plurality of said hook elements spaced along said bar and attached directly to said bar.

6. A support as in claim 1 further comprising a second elongated bar attached by at least one arm extending vertically to said first named bar, said second bar located below said first named bar with an open space between said bars.

7. A support as in claim 6 further comprising a latch element on said at least one arm between said first and second bars to permit said second bar to be detached from said first named bar.

8. A support as in claim 6 wherein there are a plurality of said arms connecting said first and second bars which are generally transverse to both said bars.

9. The support as in claim 8 in combination with a bag including a flap extending from the open end of the bag body to wrap over said second bar, said flap of said bag having a slit into which a said vertical arm fits with a section of the flap on each side thereof, said flap sections and bag body including mating fasteners to hold said bag onto said bar when mated.

10. The support as in claim 6 in combination with a bag including a flap extending from the open end of the bag body to pass through the space between the two bars and to wrap over said second bar, said bag including mating fasteners on said flap and bag body to hold said bag onto said lower bar when mated.

11. A support as in claim 6 wherein there are a pair of said arms one connected at each end of said bars and extending at an angle to the elongated bar.

12. A support as in claim 6 wherein said first named and second bars are generally parallel.

13. A support as in claim 1 further comprising a stem extending vertically to said bar to which said hook is attached.

14. The support as in claim 13 in combination with a bag including a flap extending from the open end of the bag body to wrap over said bar, said flap of said bag having a slit into which said support stem fits with a section of the flap on each side thereof, said flap sections and bag body including mating fasteners to hold said bag onto said bar when mated.

15. A support as in claim 13 further comprising a universal swivel joint on said stem.

16. A support as in claim 13 wherein said stem further comprises a socket into which said stem fits and means for latching the stem at a predetermined height relative to said socket.

17. The support as in claim 1 wherein said horizontal rail including a slot, the end of said hook element having a tab that fits in said slot.

18. The support as in claim 17 further comprising a bracket attached to said rail, said bracket including said slot.

19. The support as in claim 1 in combination with a bag including a flap extending from the open end of the bag body to wrap over said bar, said bag including mating fasteners on said flap and bag body to hold said bag onto said bar when mated.

20. The support as in claim 19 in combination with said central rail including a slot, the end of said hook element having a tab that fits in said slot.

21. The support as in claim 1 in combination with a flag having reflective material on a surface thereof said flag having a plurality of straps having mating fasteners to wrap over said bar to hang said flag from said bar and fasteners to hold said flag to extend over a front portion of a said carriage or stroller.

22. The support as in claim 21 wherein said flag has a central section and an end section foldable from each end of said central section, said flag central section to overly the front part of said carriage or stroller and said end sections to overly the stroller sides.

* * * * *